United States Patent [19]
Strain

[11] 3,733,066
[45] May 15, 1973

[54] FLEXIBLE COUPLING
[76] Inventor: William E. Strain, 503 Shirley Drive, Birmingham, Mich. 48009
[22] Filed: Sept. 21, 1971
[21] Appl. No.: 182,340

[52] U.S. Cl. ............................................. 267/148
[51] Int. Cl. ............................................. F16f 15/10
[58] Field of Search ..................................... 267/148

[56] References Cited
UNITED STATES PATENTS 3,204,943  9/1965  Kerley, Jr. ........................... 267/148

Primary Examiner—James B. Marbert
Attorney—Cullen, Settle, Sloman & Cantor

[57] ABSTRACT

A flexible coupling including a pair of generally coaxially aligned hub members, each hub secured to a circular cable to transmit radial forces. The hub members each have a pair of opposed radial arms and the cable is secured to the arms by clamps. The radius of the circular cable is preferably less than the length of the arms and the clamps are hook-shaped, with the shank portion of the hook parallel to the axis of the hubs, to secure the cable radially inwardly of the distal ends of the arms.

10 Claims, 4 Drawing Figures

PATENTED MAY 15 1973          3,733,066

INVENTOR.
WILLIAM E. STRAIN.

BY

CULLEN, SETTLE, SLOMAN & CANTOR.

ATT'YS.

3,733,066

FLEXIBLE COUPLING

FIELD OF THE INVENTION

The flexible coupling of this invention is adapted to transmit radial forces, including rotation, while permitting axial and radial misalignment between the driving and driven members. The coupling is also capable of absorbing vibration and shock loading and minimizing backlash, which is a problem in coupling design.

One of the couplings disclosed in the prior art, U.S. Pat. No. 3,204,943, attempts to solve these problems by utilizing a plurality of linear cable sections joined by collars into a rigid polygonal loop. A pair of opposed plates are secured within the loop to transmit the desired radial forces. An object of the present invention is to provide a coupling which is simpler in design than this structure and more efficient in operation.

The coupling of this invention includes a pair of generally coaxially aligned hub members adapted to transmit the radial loading having a plurality of radially extending, equally spaced arms adjacent one end. A circular cable, such as the twisted monofiliment cable disclosed in the above referenced patent, is located between the arms of the hubs. The diameter of the cable is preferably smaller than the circular projection of the arms. The hub members are positioned on opposite sides of the cable, in spaced relation, with the arms of one hub member bisecting the angle defined between the arms of the opposed hub member. The cable is clamped to the arms by a clamping means provided on each of the arms radially inwardly from the distal end of the arms.

In the preferred embodiment of the flexible coupling of this invention, the clamping means is a hook-shaped clamp having a shank portion extending generally parallel to the axis of the hub members and a hook-portion which overlies the opposed surfaces of the arms. The arms may also be provided with a semi-circular groove which receives the cable to securely clamp the hub members on the cable in spaced relation to permit transmission of radial forces while permitting axial and radial misalignment between the driving and driven hub member.

In the disclosed embodiment of the flexible coupling, the cable is provided with a plurality of generally cylindrical sleeves which are equally spaced on the cable. The sleeves are preferably formed of a material softer than the cable and are secured on the cable by compressing the sleeves. The sleeves provide accurate alignment of the hub members, which is important for uniform flexing and dampening of the vibration and shock forces, and to prevent wear of the cable.

In the preferred embodiment of the flexible coupling of this invention, the hub members are spaced axially, by the clamping members, sufficiently to provide substantial flexibility for correction of misalignment between the hub members. In the disclosed embodiment, the radius of the circular cable is less than the diameter of the cylindrical hub portions and the hub members are spaced axially a distance nearly equal to the radius of the hub portions, providing substantial flexibility and minimizing backlash. The disclosed embodiment of the flexible coupling is simple to assemble and disassemble and is relatively inexpensive compared to other all metal flexible couplings.

DESCRIPTION OF THE PREFERRED EMBODIMENT

Figure 1:
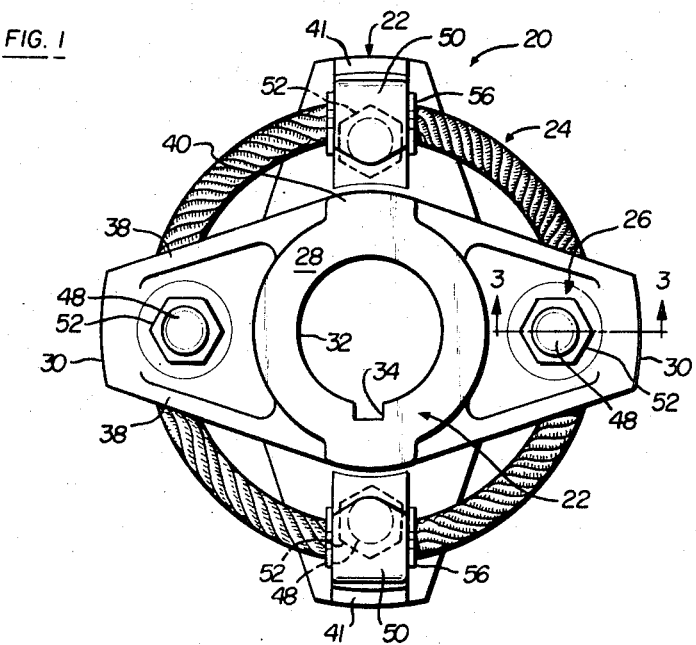
FIG. 1 is a top elevation of one embodiment of the flexible coupling of this invention.
Figure 2:
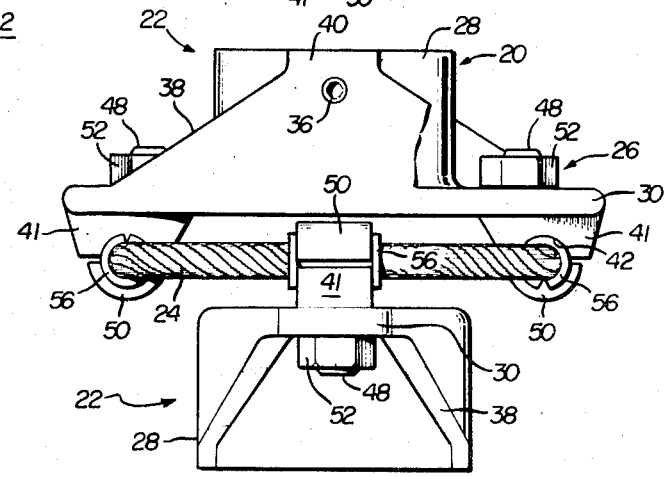
FIG. 2 is a side elevation of the flexible coupling shown in FIG. 1.

The flexible coupling 20 disclosed in FIGS. 1 to 4 includes a pair of hub members 22, a circular cable assembly 24 disposed between the hub members and four clamping means 26 securing the opposed hub members to the cable assembly 24.

The hub members 22 each include a generally cylindrical hub portion 28 and a pair of radially extending arms 30 adjacent the opposed ends of the hub members. The hub members are adapted to transmit radial loads, including rotation, from the driving hub member to the driven hub member. The disclosed embodiment of the hub members include a cylindrical bore 32 having a key-way slot 34 and set-screw 36 which is adapted to receive a conventional shaft for imparting radial motion. It will be understood that the bore 32 may also be threaded to receive the driving or driven shaft or the shaft may be integral with the hub depending upon the particular application for the coupling.

The radially extending arms 30, in the disclosed embodiment of the hub member, each include a pair of reinforcing web portions 38 which merge into the axial boss portions 40 on the hub portion of the member. A flange 41, having an arcuate semicircular groove 42 configured to receive the cable assembly is provided on each of the opposed ends of the arm portions, and an aperture 44 is disposed through the flanges to receive the clamping means 26, as shown in FIG. 3.

Figure 3:
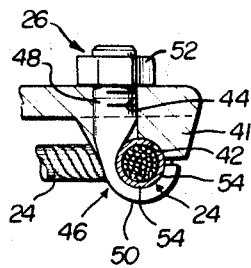
FIG. 3 is a side cross sectional view of the clamping means utilized in the flexible coupling shown in FIG. 1, in the direction of view arrows 3—3.

The clamping means shown in FIG. 3 includes a hook-shaped clamp 46 having a shank portion 48, which is received through the aperture 44 in the hub member arms and a hook-shaped portion 50 which is adapted to overlie the semicircular groove 42 in the arms and secure the cable assembly 24. The shank portion, in the disclosed embodiment, is threaded to receive a nut 52 which biases the hook portion toward the arm and securely retains the cable.

Figure 4:
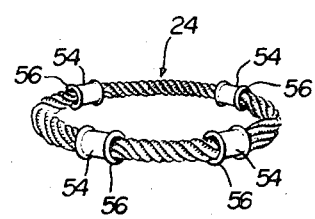
FIG. 4 is a perspective top view of the cable assembly utilized in the flexible coupling shown in FIGS. 1 and 2.

The disclosed embodiment of the cable assembly 24, as shown in FIG. 4, includes four equally spaced cylindrical sleeves 54 which are received in the semicircular grooves 42 in the arms of the hub members to accurately position the arm portions on the cable and prevent wear of the cable. The sleeves each include a pair of opposed flanged portions 56 which locate the sleeves in the flange portions. The sleeves are preferably formed of a material softer than the cable and are compressed on the cable to prevent axial movement of the sleeves.

The dimensional relation of the flexible coupling of this invention is important to provide maximum allowance for axial and radial misalignment of the hub members. The disclosed hub members are each adapted to receive a shaft for transmission of radial forces, such as the driving and driven shafts of a machining apparatus. One of the hubs may receive the motor shaft, for example, and the opposed hub may receive the driven shaft of the machine. In such applications, it is generally difficult to accurately align the shafts and eliminate vibrational forces which may be detrimental to the machining apparatus. The coupling of this invention is capable of transmitting the intended radial or rotational forces, although the shafts are not accurately aligned and simultaneously dampen vibrational forces. Further, and most important, the coupling of this invention is not subject to heat deterioration, because all of the parts may be metallic, and the coupling may be easily assembled and disassembled at the coupling site.

The preferred dimensional relationship of the coupling includes the space provided between the hub members which permits compensation for substantial misalignment between the axes of the hub members. The spacing in the disclosed embodiment is provided by the clamping means 26, wherein the shank portion 48 of the clamp is generally parallel to the axis of the hub members, in the relaxed position. The radius of the cable may thus be less than the length of the arms, such that the cable is located radially inwardly of the distal ends of the arms. Stated another way, the diameter of the cable is smaller than the diameter a circle circumscribing the distal ends of the arm portions of the hub. The hub members are spaced axially a distance nearly equal to the radius of the hub portions, providing substantial flexibility and minimizing backlash.

It will be understood that the materials of the elements of the coupling members will, in part, depend upon the particular application of the coupling. The hub members may be cast from any suitable material, including aluminum or steel. Alternatively, the hub members may be machined. The clamps may be formed from forged steel, for example, and the cable may be a suitable resilient twisted monofiliment cable, such as stainless steel. As described above, the sleeves 54 are preferably formed of a material softer than the cable, such as brass, aluminum or copper. Where the cable is a continuous circular cable, the sleeves serve to accurately position the arms on the cable and prevent wear, as described above. The sleeves may also be utilized to secure the ends of a cable member where the cable is not continuous.

The disclosed embodiment of the flexible coupling of this invention is assembled by disposing the cable assembly into the semicircular grooves 42 in the arm portions of one of the hub members. The clamp 46 is then received through the aperture 44, with the hook portion 50 overlying the cable, and the cable is secured by tightening the nut 52 on the threaded shank portion of the clamp. The opposed hub member is secured to the cable in a like manner.

In the preferred embodiment, the cable assembly includes a plurality of equally spaced sleeves 54 equal in number to the total number of arms 30 on the hub members. In the disclosed embodiment, each hub member includes two oppositely disposed arm portions and the cable includes four sleeves spaced ninety degrees on the circumference of the cable. It will be understood however that the hub member may include a greater number of arms, in which case the arms are preferably equally spaced about the circumference of the cylindrical hub portion 28 and the hubs are assembled with the arms of one hub member bisecting the angle defined between the arms of the opposed hub member. The sleeves thus accurately align the arms on the cable and provide the other advantages described above. The coupling may be disassembled merely by removing the clamping means.

I claim:

1. A flexible coupling, comprising:
   a. a pair of generally coaxially aligned hub members adapted to transmit radial loads,
   b. each of said hub members having a plurality of radially extending, equally spaced arms adjacent one end of the hub member,
   c. a circular cable having a diameter smaller than the circular projection of said arms located between said arms and generally coaxially aligned with said hub members,
   d. said hub members positioned on opposite sides of said cable, in space relation, with said arms of one hub member bisecting the angle defined between the arms of the opposed hub member, and,
   e. clamping means on each of said arms adapted to clamp said cable to said arms radially inwardly of the distal end of said arms.

2. The flexible coupling defined in claim 1, characterized in that said clamping means includes a plurality of hook-shaped clamps one extending from each of said arms radially inwardly of the distal end, clamping said cable against said arms.

3. The flexible coupling defined in claim 2, characterized in that said hook-shaped clamps each include a shank portion extending generally parallel to the axis of said hub members, toward the opposed hub member, to secure said hub members in spaced relation.

4. The flexible coupling defined in claim 1, characterized in that said cable includes a plurality of equally spaced, generally cylindrical sleeves, each of said clamping means secured to one of said sleeves, said sleeves formed of a softer material than the cable and compressed against said cable to prevent axial movement.

5. A flexible coupling, comprising:
   a. a pair of generally coaxially aligned hub members adapted to transmit radial loads,
   b. each of said hub members having a pair of radially extending opposed arms adjacent one end,
   c. a circular cable having a radius smaller then the length of said arms located between said arms and generally coaxially aligned with said hub members,
   d. said hub members positioned on said cable, in spaced relation, with said arms of one hub member perpendicular to the arms of the opposed hub member, and,
   e. a generally hook-shaped clamp on each of said arms, including a shank portion generally parallel to the axis of said hub members, secured to said arms and a hook portion receiving said cable and securing said cable inwardly of the distal end of said arms.

6. The flexible coupling defined in claim 5, characterized in that said arms each include an arcuate semicircular groove inwardly of the distal end of said arms which receives said circular cable, and said hook portion of the clamp overlies said grooves to secure the cable therein.

7. The flexible coupling defined in claim 6, characterized in that the shank portion of each of said clamps is received through one of said arms and threadably receives a nut to bias the hook portion against said cable.

8. The flexible coupling defined in claim 5, characterized in that said circular cable is a continuous, spirally wound monofiliment metal cable.

9. The flexible coupling defined in claim 5, characterized in that said cable includes four equally spaced, generally cylindrical sleeves, each of said clamping means secured to one of said sleeves, said sleeves formed of a softer material than said cable and compressed against said cable to prevent axial movement.

10. A flexible coupling, comprising:
   a. a pair of generally cylindrical coaxially aligned hub members adapted to transmit rotary loads,
   b. each of said hub members having a pair of radially extending opposed arms adjacent one end,
   c. a circular cable having a diameter smaller than the circular projection of said arms located between said arms and generally coaxially aligned with said hub members,
   d. said cable having four equally spaced cylindrical sleeves received on said cable and secured thereto, and
   e. a generally hook-shaped clamp on each of said arms including a shank portion generally parallel to the axis of said hub and a hook portion receiving said cable and clamping said cable against said arms inwardly of the distal end of said arms.

* * * * *